UNITED STATES PATENT OFFICE.

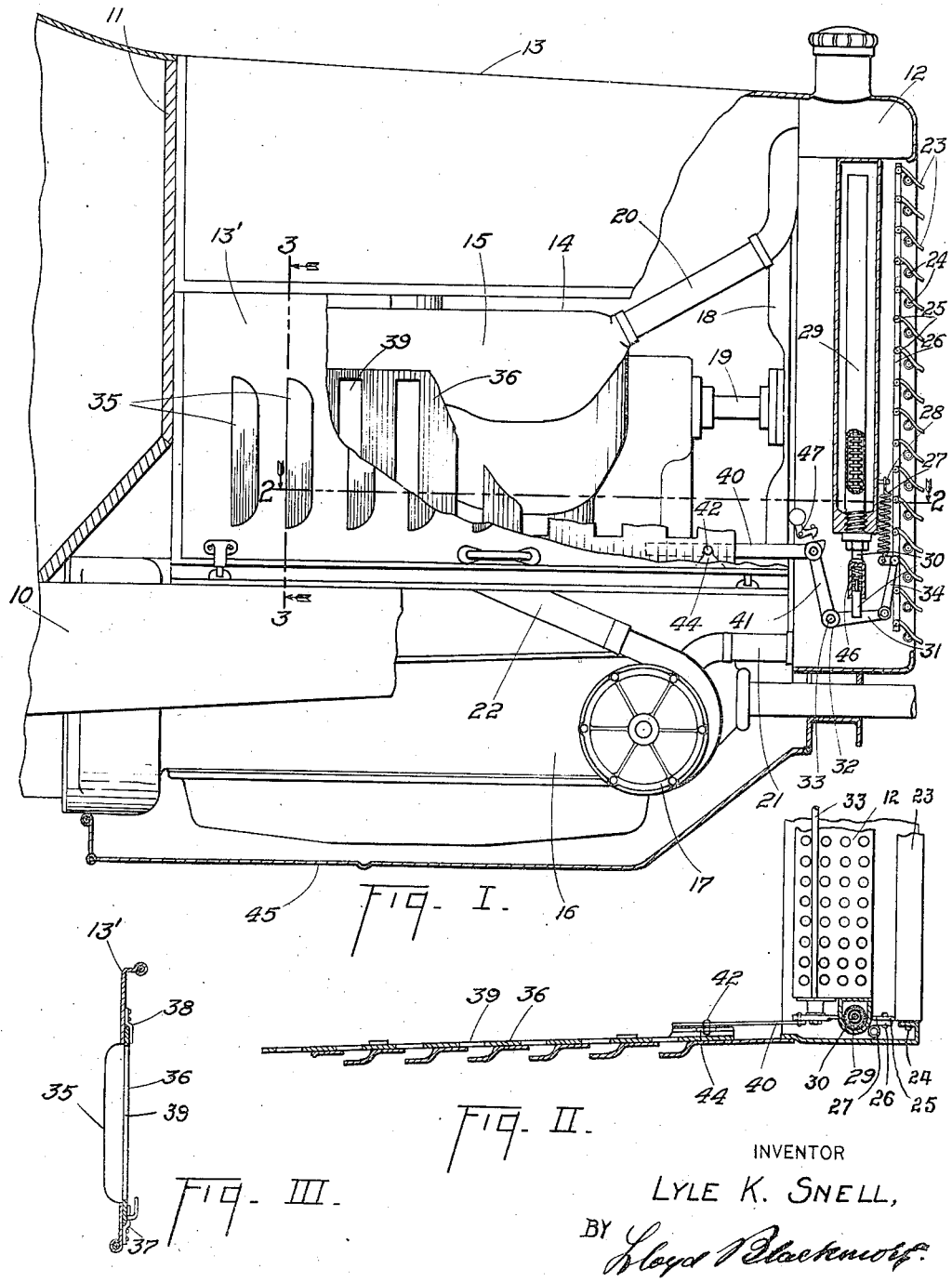

LYLE K. SNELL, OF DETROIT, MICHIGAN, ASSIGNOR TO CADILLAC MOTOR CAR COMPANY, OF DETROIT, MICHIGAN, A CORPORATION OF MICHIGAN.

MOTOR-VEHICLE.

1,310,898.   Specification of Letters Patent.   Patented July 22, 1919.

Application filed October 1, 1917. Serial No. 194,259.

*To all whom it may concern:*

Be it known that I, LYLE K. SNELL, a citizen of the United States, and resident of Detroit, Wayne county, State of Michigan, have invented certain new and useful Improvements in Motor-Vehicles, of which the following is a specification.

This invention relates to improvements in motor vehicles.

One of the objects of this invention is to devise a motor vehicle which will operate efficiently under extreme variations in climatic temperatures.

Another object of this invention is to devise a motor vehicle which will retain heat within the motor compartment when desired.

Another object of this invention is to devise a motor vehicle which shall have an automatically operated means for maintaining the motor compartment at a substantially constant temperature.

Another object of this invention is to protect the vehicle motor from chilling blasts of air, and thus prevent condensation in the crank case.

Another object of this invention is to bring about a normal operating condition of a motor in the least possible time after being started under very low temperature conditions.

Another object of this invention is to bring about normal temperatures in certain portions of the motor in the shortest possible time after starting the motor under comparatively low atmospheric temperature conditions.

These and other objects will more clearly appear from the following description, taken in connection with the accompanying drawings which form a part of this specification and in which:

Figure 1 is a side elevation view of the forward part of a motor vehicle, partly broken away and partly in section, to more clearly show the invention as applied thereto.

Fig. 2 is a plan sectional view of one side of the motor housing substantially on the line 2—2 of Fig. 1.

Fig. 3 is a vertical sectional view on substantially the line 3—3 of Fig. 1.

Referring to the drawings, 10 is the frame of a motor vehicle having the dash 11, the radiator 12 and the hood 13 arranged thereon as customary, and the motor 14 mounted therein under the hood. The motor 14 has the jacketed cylinders 15 supported on the crank case 16 and a pump 17 mounted on one side of said crank case and suitably driven by the motor, as is also the fan 18 mounted on the shaft 19 extending from the front of said motor.

The temperature regulating system of the motor comprises the usual water connections such as the pipe 20 leading from the cylinder jacket outlet to the upper end of the radiator, the pipe 21 leading from the bottom of the radiator to the pump 17, and the pipe 22 leading from the pump to the cylinder jacket.

The front of the radiator 12 is provided with a plurality of horizontally arranged shutters 23 pivotally supported at each end thereof as at 24 in the sides of the radiator casing, said shutters having lugs 25 extending from the inner sides thereof and interconnected one with the other by the bar 26 whereby said shutters may be operated coincidentally to form a complete closure across the front of the radiator, the bar 26 being normally held in its upper position to close the shutters as by a spiral spring 27 secured to said bar adjacent the lower end thereof, and to the side of the shutter casing as at 28.

A thermostat 29 is arranged in the radiator at one side thereof, and extends vertically throughout substantially the entire height of the radiator whereby the general temperature throughout different heights of the radiator will act upon the thermostat, that is, with an increase in temperature the thermostatic elements which include a circumferentially corrugated tube, will be acted upon in a manner well understood in the art, and cause the central rod 30 projecting from the lower end of the thermostat to move downwardly, where it contacts with an arm 31 of a bell crank lever 32 secured to a cross shaft 33 suitably journaled toward the lower part of the radiator. The outer end of the arm 31 is pivotally connected as by the link 34 with the bar 26, to open the shutters at such times as the temperature within the radiator raises to a predetermined degree.

The sides 13' of the hood 13 are provided with the customary louvers 35 opening therethrough, and providing ventilation through the side housing of the motor, said sides 13' also being provided on the inside with cover plates 36 slidably arranged between the brackets 37 and 38, adjacent the bottom and top respectively of the sides 13', the covers 36 having openings 39 therethrough, registering with the louver openings, so that the covers may be moved to close the openings entirely or to permit any degree of ventilation as desired, and to accomplish this, each cover is pivotally connected as by a link rod 40 to a lever 41 secured at each end of the cross shaft 33, the lever 41 forming part of the bell crank lever 32 at that end of the shaft 33. Each link rod 40 has a pin 42 secured thereto and projecting outwardly and into a flared slot 44 in the cover 36. By this arrangement, the sides 13' of the hood may be closed down in position over the motor with the cover 36 any place throughout its travel, and the flared portion of the slot will be engaged by the pin and the cover moved to its proper place with the pin at the narrow part of the slot. When the motor is comparatively cool, both the front radiator shutters and the louver covers will be in their closed position, forming a complete housing about the front and sides of the motor, and in addition, a protection is provided on the underside of the motor by arranging a pan 45 across the frame 10 of the vehicle, extending from the radiator to a point well back of the motor, so that when the front of the radiator and louver shutters are closed, the entire motor is housed by the dash, the radiator casing with shutters, the hood, the sides with the louver covers and the pan.

With the motor completely housed as above explained, any heat contained in the motor itself or the jacket water or even the radiator water and contents of the crank case will be retained for a comparatively long time, and the motor may be promptly started at any time desired, or if the motor has been idle for days during winter weather and is quite cold, it will quickly warm up when started as the complete housing effectually insulates the motor proper from the surrounding atmosphere and this is especially advantageous in warming the contents of the crank case whereby the general lubricating means of the motor will function efficiently as also the parts of the carbureter and intake manifold will be quickly warmed by the warmed air about the motor.

It will thus be understood that the invention comprises many advantages in retaining heat during operation and is much more efficient than devices designed for covering the outside of the hood or the front of the radiator and yet leaving openings for the escape of heat and also leaving the lower part of the motor where the lubricating oil is carried improperly protected from the cold atmospheric air during winter.

The invention not only provides an adequate protective housing for the motor when required, but also provides a ventilating means where most effective when the motor reaches an efficient working temperature; that is, the thermostat contained within the radiator will be actuated when the controlling medium such as water reaches a predetermined temperature and will open the radiator shutters and side louver covers permitting the fan to circulate air through the radiator about the upper part of the motor and out the side louvers and yet protect the crank case of the motor from a direct blast of chilled atmosphere.

It is preferable, in connecting the thermostat to the bell crank lever, to control the operation of the radiator shutters and louver cover to provide a spring in the rod 30 as shown at 46, whereby at such time as the motor has become sufficiently warm to open both the shutters and cover, and if it is desired to close the same to retain the heat, they may be manually closed by moving a link rod 40 toward the dash and holding the same in position as by a catch 47.

While I have described and will specifically claim what I deem to be a preferred embodiment of my invention, it will be obvious to those skilled in the art that various modifications and changes may be made without departing from the spirit and scope hereof.

Having thus described my invention, what I claim and desire to secure by Letters Patent is:

1. The combination with a vehicle front frame, of a motor mounted on said frame, a radiator mounted on said frame in advance of said motor and operatively connected therewith, a dash board supported across said frame behind said motor, a casing supported across said frame in front of said radiator, a hood secured to said frame over said motor, said casing and said hood having shutters closing ventilation openings therethrough.

2. The combination with a vehicle front frame, of a motor mounted on said frame, a radiator mounted on said frame in advance of said motor and operatively connected therewith, a dash board supported across said frame behind said motor, a casing supported across said frame in front of said radiator, a hood secured to said frame over said motor, said casing and said hood having shutters closing ventilation openings therethrough, and thermostatically controlled by the temperature within said radiator.

3. The combination with a hydrocarbon motor having a radiator operatively connected thereto, of a housing inclosing said motor and radiator and having front inlet openings and side outlet openings, shutters arranged to close said openings, a thermostat in said radiator, and means operatively connecting said thermostat and said shutters.

4. The combination with a hydrocarbon motor having a radiator operatively connected thereto, of a housing inclosing said motor and radiator and having front inlet openings and side outlet openings, spring held shutters arranged to close said openings, a thermostat in said radiator and a bell crank lever having pivotal connection with said shutters and actuated by said thermostat.

5. The combination with a hydrocarbon motor having a radiator operatively connected thereto, of a housing inclosing said motor and radiator and having side louvers and a front radiator opening, a slide shutter arranged over said louvers and a thermostat controlled by the temperature of said radiator for actuating said shutter.

6. The combination with a hydrocarbon motor having a radiator operatively connected thereto, of a housing inclosing said motor and radiator and having side louvers, a thermostat arranged in said radiator, and a rod operatively connected to said thermostat and having a pin adapted to enter a notch in said shutter.

7. The combination with a hydrocarbon motor having a radiator operatively connected thereto, of a housing about said motor and said radiator and having ventilating openings therethrough, shutters arranged over said openings and spring held to their closed position, thermostatic means for opening said shutters and means operative when the motor is inactive for retaining said shutters closed independent of said thermostatic action.

8. In combination, a motor, a radiator, a casing inclosing said motor and radiator and having shutters closing openings therethrough, a thermostat actuated by an increase in temperature of said motor and radiator for opening said shutters and means independent of said thermostat for closing said shutters.

9. In combination, a motor, a radiator, a casing inclosing said motor and radiator and having shutters closing openings therethrough, a thermostat actuated by an increase in temperature of said motor and radiator for opening said shutters and means manually operated independent of said thermostat for closing said shutters while said motor and said radiator are comparatively hot.

In testimony whereof I affix my signature.

LYLE K. SNELL.